United States Patent
Mohri et al.

[11] Patent Number: 5,688,480
[45] Date of Patent: Nov. 18, 1997

[54] COMPLEX METAL OXIDE POWDER AND METHOD FOR THE PRODUCTION OF THE SAME

[75] Inventors: Masahide Mohri; Hironobu Koike; Tetsu Umeda, all of Ibaraki, Japan

[73] Assignee: Sumitomo Chemical Company, Limited, Osaka, Japan

[21] Appl. No.: 411,636

[22] PCT Filed: Aug. 11, 1994

[86] PCT No.: PCT/JP94/01330

§ 371 Date: May 15, 1995

§ 102(e) Date: May 15, 1995

[87] PCT Pub. No.: WO95/04701

PCT Pub. Date: Feb. 16, 1995

[30] Foreign Application Priority Data

| Aug. 11, 1993 | [JP] | Japan | 5-220715 |
| Oct. 28, 1993 | [JP] | Japan | 5-294528 |
| Nov. 9, 1993 | [JP] | Japan | 5-304639 |
| Nov. 12, 1993 | [JP] | Japan | 5-307425 |

[51] Int. Cl.$^6$ .................. C01F 17/00; C01G 23/04; C01G 51/04; C01G 53/04

[52] U.S. Cl. .................. 423/263; 423/593; 423/594; 423/595; 423/596; 423/598; 423/599; 423/600

[58] Field of Search .................. 423/593, 600, 423/263, 594, 595, 596, 598, 599

[56] References Cited

U.S. PATENT DOCUMENTS

| 2,847,316 | 8/1958 | Michel et al. | 423/593 |
| 4,350,558 | 9/1982 | Boudot et al. | 423/593 |
| 4,350,559 | 9/1982 | Boudot et al. | 423/593 |
| 4,465,656 | 8/1984 | Pastor et al. | 423/593 |
| 4,764,357 | 8/1988 | Sherif et al. | 423/593 |
| 5,011,822 | 4/1991 | Barder | 423/593 |
| 5,531,974 | 7/1996 | Bak et al. | 423/593 |
| 5,607,658 | 3/1997 | Kaneko et al. | 423/593 |

*Primary Examiner*—Wayne Langel
*Attorney, Agent, or Firm*—Sughrue,Mion,Zinn,Macpeak & Seas, PLLC

[57] ABSTRACT

A complex metal oxide powder having at least two metal elements, which contains polyhedral particles each having at least 6 planes, a number average particle size of from 0.1 to 500 μm, and a $D_{90}/D_{10}$ ratio of 10 or less in which $D_{10}$ and $D_{90}$ are particle sizes at 10% and 90% accumulation, respectively from the smallest particle size side in a cumulative particle size curve of the particles, and an yttrium-aluminum garnet powder containing polyhedral particles each having at least 6 planes, and a number average particle size of 20 to 500 μm. These complex metal oxides contain less agglomerated particles, and have a narrow particle size distribution and a uniform particle shape.

23 Claims, 8 Drawing Sheets

COMPLEX METAL OXIDE POWDER AND METHOD FOR THE PRODUCTION OF THE SAME

FIELD OF THE INVENTION

The present invention relates to a complex metal oxide powder comprising at least two metal elements which is used as a raw material powder of an oxide ceramic that is used as a functional material or a structural material, which is used in a dispersed state as a filler or a pigment, or which is used as a raw material powder for the production of a single crystal or for flame spray coating, and a method for the production thereof.

PRIOR ART

In general, an oxide ceramic which is used as a functional material or a structural material is produced through a molding step and a calcination step from a metal oxide powder as a raw material. Properties of the metal oxide powder to be used as the raw material have a large influence on the production steps, and functions and physical properties of the ceramic product. Then, it is highly desired to provide a complex metal oxide powder having powder properties which are precisely controlled so that they are suitable for an intended application.

When a metal oxide powder is used in a dispersed state such as a magnetic fine powder, a filler or a pigment, since properties of each particle are reflected directly on the dispersed state, the control of the properties of the powder is more important.

The required properties of the complex metal oxide powder vary with a kind and application form of the metal oxide. Commonly required properties are a uniform particle size of the metal oxide powder, that is, a narrow particle size distribution, and a weak bond among primary particles, that is, less agglomeration and good dispersibility.

For example, yttrium-aluminum garnet is, in a narrow sense, a complex metal oxide represented by the general formula: $Y_3Al_5O_{12}$, and in a broad sense, it includes a complex metal oxide in which a part of yttrium elements are replaced by cerium, neodymium, terbium, and the like. The yttrium-aluminum garnet is useful as a mother material in optoelectronics. For instance, single crystal yttrium-aluminum garnet in which a part of yttrium elements are replaced by neodymium is used as a laser oscillator material, and crystalline particles of the yttrium-aluminum garnet in which a part of yttrium elements are replaced by cerium or terbium are used as a fluorescent substance, and so on.

A rare earth element-iron garnet ($(R_3Fe_5O_{12}$ wherein R is a rare earth element) which is represented by yttrium-iron garnet $(Y_3Fe_5O)_{12})$, or a garnet in which a part of the rare earth element and/or iron are replaced by other metal is useful as a magnetic material of microwave, or a material of a part which uses a magnet-optical effect.

A solid solution of metal compounds, for example, a solid solution of zirconium oxide and an oxide of at least one metal selected from yttrium, magnesium, calcium, cerium and rare earth elements such as scandium and ytterbium is useful as a material to be used in a high temperature resistant material, an ion conductive material, a piezoelectric material, etc. Further, it is used as a raw material of a sintered material or flame spray coating.

Hitherto, these complex metal oxides are produced by a liquid phase method, a solid phase method, a gas phase method, a hydrothermal synthesis method, a flux method, and the like. The produced metal oxide powders have some problems such as formation of agglomerates, a wide particle size distribution of the intended product, removal of impurities, control of a particle size, and so on, and they are not necessarily satisfactory. Further, the above production methods themselves have problems including reaction conditions such as complicated procedures and difficult control, problems of apparatuses, costs of raw materials, and so on. Then, it has been desired to develop a complex metal oxide powder which contains less agglomerated particles and have a narrow particle size distribution, and to develop a method for producing such complex metal oxide powder generally and advantageously in an industrial production.

SUMMARY OF THE INVENTION

An object of the present invention is to provide a complex metal oxide comprising at least two metal element which contains less agglomerated particles and has a narrow particle size distribution and a uniform particle shape, and is preferably used as a metal oxide powder to be used as a raw material powder of an oxide ceramic that is used as a functional material or a structural material, a metal oxide powder to be used in a dispersed state as a filler or a pigment, or a metal oxide powder to be used as a raw material powder for the production of a single crystal or for flame spray coating.

Another object of the present invention is to provide a production method which can be generally employed in the production of such metal oxide powder and is excellent industrially.

As a result of the extensive study on the complex metal oxide powders, it has been found that, when a raw material is calcined in a specific atmosphere gas, the above described complex metal oxide comprising at least two metal elements which contains less agglomerated particles and has a narrow particle size distribution and a uniform particle shape is obtained, and that such method can be employed generally in the production of various metal oxide powders and excellent industrially, and the present invention has been completed after further investigations.

That is, according to a first aspect of the present invention, there is provided a complex metal oxide powder comprising at least two metal elements, which comprises polyhedral particles each having at least 6 planes, a number average particle size of from 0.1 to 500 μm, and a $D_{90}/D_{10}$ ratio of 10 or less where $D_{10}$ and $D_{90}$ are particle sizes at 10% and 90% accumulation, respectively from the smallest particle size side in a cumulative particle size curve of the particles.

According to a second aspect of the present invention, there is provided an yttrium-aluminum garnet powder comprising polyhedral particles each having at least 6 planes, and an average particle size of 20 to 500 μm.

According to a third aspect of the present invention, there is provided a method for producing a complex metal oxide powder comprising at least two metal elements, which method comprises calcining a mixture of at least two metal oxide powders and/or metal oxide precursor powders, or a metal oxide precursor powder comprising at least two metal elements in the presence or absence of a seed crystal in an atmosphere containing at least one gas selected from the group consisting of (1) a hydrogen halide, (2) a component prepared from a molecular halogen and steam and (3) a molecular halogen.

DETAILED DESCRIPTION OF THE INVENTION

Figure 1:
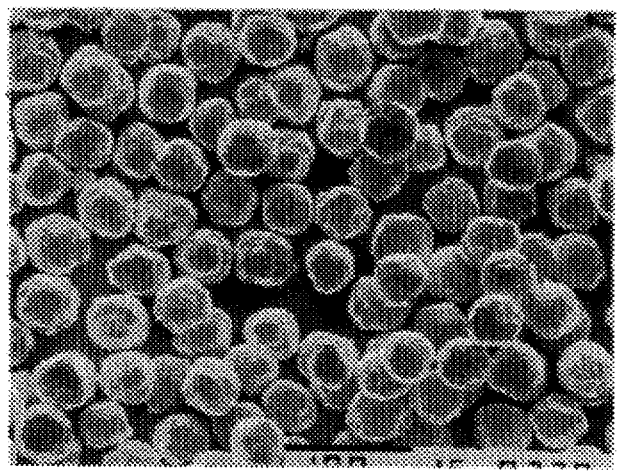
FIG. 1 is a scanning electron microscopic photograph (×172) showing a particle structure of an yttrium-aluminum garnet powder observed in Example 1.

The present invention will be explained in detail.

The complex metal oxide powder of the present invention comprises at least two metal elements and is a compound of said at least two metal elements and oxygen. The complex metal oxide powder comprising at least two metal elements includes a metal oxide solid solution powder containing at least two compounds each comprising a metal element and oxygen in a solid solution state.

The method of the present invention produces a complex metal oxide by calcining a mixture of at least two metal oxide powders and/or metal oxide precursor powders, or a metal oxide precursor comprising at least two metal elements in the presence or absence of a seed crystal in an atmosphere containing at least one gas selected from the group consisting of (1) a hydrogen halide, (2) a component prepared from a molecular halogen and steam and (3) a molecular halogen.

When the complex metal oxide powder comprising at least two metal elements is produced by the method of the present invention, a mixture of at least two metal oxide powders and/or metal oxide precursor powders, or a metal oxide precursor powder comprising at least two metal elements is used as a raw material powder.

The metal oxide precursor is intended to mean a material which gives the metal oxide consisting of at least one metal element and oxygen by a decomposition reaction or an oxidation reaction in calcination, and includes, for example, metal hydroxides, hydrated metal oxides, metal oxyhydroxide, metal oxyhalides, and so on.

A seed crystal which may be used in the present invention is intended to mean a crystal which functions as a growing site for the crystal growth of the metal oxide. Around the seed crystal, the metal oxide grows. Any seed crystal can be used insofar as it has this function. For example, the complex metal oxide or the metal oxide solid solution, as the product, is preferred.

There is no limitation on a manner for adding the seed crystal to the raw material powder. For example, a mixing manner such as ball milling, ultrasonic dispersing, and the like can be used.

The above at least two metal oxide powders and/or metal oxide precursor powder disclosed as the raw materials, the metal oxide precursor powder comprising at least two metal elements disclosed as the raw material, and those raw materials to which the seed crystal is added are generally named as the raw material metal oxide powder.

The complex metal oxide powder comprising at least two metal elements according to the present invention is a complex metal oxide which comprises at least two metal elements except a combination of only alkali metals, and oxygen, or a metal oxide solid solution in which at least two compounds each comprising a metal element and oxygen are present in a solid solution state. An example of such complex metal oxide powder is a complex metal oxide having a garnet structure represented by the formula:

$$(M_A)_3(M_B)_2[(M_C)O_4]_3 \qquad (I)$$

wherein $M_A$, $M_B$ and $M_C$ are the same and different and each represent at least one metal element, provided that all of $M_A$, $M_B$ and $M_C$ are not the same metal element.

In the formula (I), specifically, $M_A$ is at least one element selected from the group consisting of copper, magnesium, and rare earth elements (e.g. scandium, yttrium and lanthanum), bismuth and manganese, and $M_B$ and $M_C$ are the same or different and each at least one element selected from the group consisting of zinc, scandium, aluminum, gallium, indium, titanium, zirconium, silicon, germanium, tin, vanadium, chromium, manganese, iron, cobalt and nickel.

In some cases, compounds do not have the garnet structure due to ionic radii of the metal elements $M_A$, $M_B$ and $M_C$.

More specifically, there are exemplified aluminum garnets such as a complex metal oxide of the above formula in which $M_A$ is, for example, yttrium, and $M_B$ and $M_C$ are both aluminum; yttrium-aluminum garnet of the above formula in which $M_A$ is yttrium a part of which is replaced by other rare earth element(s), and $M_B$ and $M_C$ are both aluminum; dysprosium-aluminum garnet of the above formula in which $M_A$ is dysprosium, and $M_B$ and $M_C$ are both aluminum; and the like.

Further, there is exemplified iron garnet such as yttrium-iron garnet as a complex metal oxide of the above formula in which $M_A$ is yttrium, and $M_B$ and $M_C$ are both iron; gadolinium-iron or dysprosium-iron garnet as a complex metal oxide of the above formula in which $M_A$ is gadolinium or dysprosium and $M_B$ and $M_C$ are both iron; etc.

In addition, a garnet of the above formula in which each $M_A$, $M_B$ and $M_C$ consists of at least two metal elements may be exemplified.

In the method of the present invention, the raw material metal oxide powder is not limited, and the powder produced by the conventional method can be used. For example, the metal oxide powder or metal oxide precursor powder produced by the liquid phase method, or the metal oxide powder produced by the gas phase method or the solid phase method may be used.

In the present invention, the raw material metal oxide powder is calcined in the atmosphere gas containing at least 1 vol. %, preferably at least 5 vol. %, more preferably at least 10 vol. % of the hydrogen halide based on the whole volume of the atmosphere gas.

As the hydrogen halide, hydrogen chloride, hydrogen bromide, hydrogen iodide and hydrogen fluoride are used independently or as a mixture of two or more of them. Preferably, hydrogen chloride, hydrogen bromine and hydrogen iodide are used.

As a component of the atmosphere gas other than the hydrogen halide, that is, a diluent gas, nitrogen, inert gas such as argon, hydrogen, steam or an air can be used.

A pressure of the atmosphere gas containing the hydrogen halide is not limited, and selected from a pressure range which is industrially used.

It is possible to carry out the calcination in the atmosphere gas containing a component prepared from the molecular halogen and steam, in place of the hydrogen halide.

As the molecular halogen, at least one of molecular chlorine, bromine, iodine and fluorine is used. Preferably, chlorine, bromine and iodine are used.

The component gas is prepared from at least 1 vol. %, preferably at least 5 vol. %, more preferably at least 10 vol. % of the molecular halogen and at least 0.1 vol. %, preferably at least 1 vol. %, more preferably at least 5 vol. % of the steam, both based on the whole volume of the atmosphere gas.

In place of the hydrogen halide, the molecular halogen may be used. The raw material metal oxide powder is calcined in the atmosphere gas containing at least 1 vol. %, preferably at least 5 vol. %, more preferably at least 10 vol. % of the molecular halogen based on the whole volume of the atmosphere gas. As the molecular halogen, at least one of molecular chlorine, bromine and iodine can be used.

As a component of the atmosphere gas other than the component prepared from the molecular halogen and steam, or the molecular halogen, that is, a diluent gas, nitrogen, inert gas such as argon, hydrogen, steam or an air can be used.

A pressure in the reaction system is not limited, and freely selected from a pressure range which is industrially used.

A manner for supplying the atmosphere gas is not critical insofar as the atmosphere gas can be supplied to the reaction system in which the raw material metal oxide powder is present.

A source of each component of the atmosphere gas and a manner for supplying each component are not critical either.

For example, as the source of each component of the atmosphere gas, a gas in a bomb can be used. Alternatively, it is possible to prepare the atmosphere gas comprising the hydrogen halide or the molecular halogen using the evaporation or decomposition of a halogen compound such as an ammonium halide, or a halogen-containing polymer such as a vinyl chloride polymer. The atmosphere gas may be prepared by calcining a mixture of the raw material metal oxide and the halogen compound or halogen-containing polymer in a calcination furnace.

The hydrogen halide and the molecular halogen are preferably supplied from the bomb directly in the calcination furnace in view of the operability. The atmosphere gas may be supplied in a continuous manner or a batch manner.

According to the present invention, when the raw material metal oxide powder is calcined in the above atmosphere gas, the metal oxide grows at a site where the raw material metal oxide powder is present through the reaction between the raw material metal oxide powder and the atmosphere gas, so that the metal oxide powder having the narrow particle size distribution, but not agglomerated particles, is generated. Accordingly, the desired metal oxide powder can be obtained, for example, by simply filling the raw material metal oxide powder in a vessel and calcining it in the atmosphere gas.

As the raw material metal oxide powder to be used in the present invention, any material which is in a powder form may be used, and a bulk density of the powder is preferably at least 40% or less based on a theoretical density. When a molded material having the bulk density exceeding 40% based on the theoretical density is calcined, a sintering reaction proceeds in the calcination step, whereby grinding is necessitated to obtain the complex metal oxide powder, and the metal oxide powder having the narrow particle size distribution may not be obtained in some cases.

A suitable calcination temperature is not necessarily critical since it depends on the kind of the intended complex metal oxide, the kinds and concentrations of the hydrogen halide, the molecular halogen and the component prepared from the molecular halogen and steam, or the calcination time. It is preferably from 500° to 1500° C., more preferably from 600° to 1400° C. When the calcination time is lower than 500° C., it may be difficult to obtain the intended complex metal oxide comprising at least two metal elements, and a long time is necessary for calcination. When the calcination temperature exceeds 1500° C., many agglomerated particles tend to be contained in the produced complex metal oxide powder.

A suitable calcination time is not necessarily critical since it depends on the kind of the intended complex metal oxide, the kinds and concentrations of the hydrogen halide, the molecular halogen and the component prepared from the molecular halogen and steam, or the calcination temperature. It is preferably at least 1 minute, more preferably at least 10 minutes, and selected from a range in which the intended metal oxide powder is obtained. As the calcination temperature is higher, the calcination time is shorter.

When the raw material metal oxide powder containing the seed crystal is calcined, the calcination temperature can be lower and the calcination time can be shorter than those when no seed crystal is used, since the metal oxide grows around the seed crystals as the growing sites.

A type of a calcination apparatus is not limited, and a so-called calcination furnace may be used. The calcination furnace is preferably made of a material which is not corroded by the hydrogen halide or the halogen, and preferably comprises a mechanism for adjusting the atmosphere.

Since the acidic gas such as the hydrogen halide or the molecular halogen is used, the calcination furnace is preferably an airtight one. In the industrial production, preferably the calcination is carried out continuously, and a tunnel furnace, a rotary kiln, or a pusher furnace can be used.

As a vessel used in the calcination step in which the raw material metal oxide powder is filled, preferably a crucible or a boat made of alumina, quartz, acid-resistant brick, graphite, or a noble metal such as platinum is used, since the reaction proceeds in the acidic atmosphere.

When the complex metal oxide powder is produced with the addition of the seed crystal to the raw material powder, the particle size and the particle size distribution of the complex metal oxide powder as the product can be controlled by changing a particle size and an added amount of the seed crystal. For example, when the amount of the seed crystal is increased, the particle size of the produced complex metal oxide powder is decreased. When the seed crystal having the smaller particle size is used, the particle size of the produced complex metal oxide powder is decreased.

By the above described method, as shown in the attached photographs, the complex metal oxide powder comprising at least two metal elements which is not agglomerated particles, and has the narrow particle size distribution and uniform particle size can be obtained, and the particle size can be controlled.

Though the complex metal oxide powder may be agglomerated particles or contain agglomerated particles, a degree of agglomeration is small, and therefore the complex metal oxide powder which contains no agglomerated particle is easily produced by simple grinding.

Depending on the raw materials or the production conditions, a by-product or an unreacted raw material oxide may remain in addition to the intended complex metal oxide comprising at least two metal elements. In such case, its remaining amount is very small, and the intended complex metal oxide can be produced by the suitable selection of the reaction conditions, or separation of the by-product or the unreacted raw material by, for example, simple washing.

A number average particle size of the complex metal oxide powder obtained by the method of the present invention is not necessarily limited. In general, it is possible to obtain the complex metal oxide powder having the particle size of 0.1 to 500 µm, preferably 0.1 to 300 µm.

The complex metal oxide powder obtained by the method of the present invention has, as the particle size distribution, a $D_{90}/D_{10}$ ratio of 10 or less, preferably 5 or less, where $D_{10}$ and $D_{90}$ are particle sizes at 10% and 90% accumulation, respectively from the smallest particle size side in a cumulative particle size curve of the particles.

When a particle size distribution is measured by a centrifugal sedimentation method or a laser diffraction scattering method, the obtained value is a particle size distribution of the agglomerated particles. When the particle size distribution measured by such method is narrow but the powder contains the agglomerated particles, the dispersibility is deteriorated, and such powder is not suitable as an industrial raw material. In the present invention, as a criterion of agglomeration of the powder, a primary particle size is measured, as a number average value, from a scanning electron microscopic photograph, and the obtained value is compared with an agglomerated particle size, that is, a particle size at 50% accumulation in a cumulative particle size curve of the particles ($D_{50}$).

That is, the degree of agglomeration is evaluated by a ratio of the agglomerated particle size to the primary particle size. When this ratio exceeds 1 (one), the powder is in the ideal state containing no agglomerated particle. With the actual powder, this ratio exceeds 1. When this ratio is 6 or less, the powder can be preferably used as the industrial raw material.

The complex metal oxide powder obtained by the method of the present invention has the ratio of the agglomerated particle size to the primary particle size of, preferably from 1 to 6, more preferably from 1 to 3, most preferably from 1 to 2.

Each of the particles of the metal oxide powder of the present invention has a polyhedral form having at least 6 planes. The number of the planes is usually from 6 to 60, preferably from 6 to 30.

Concrete examples of the complex metal oxide powder of the present invention will be explained.

The yttrium-aluminum garnet powder of the present invention is a mass of particles constituting the powder, and characterized in that their shape and particle size are uniform. The shape is a polyhedral shape having at least 6 planes. Depending on the raw material to be used and the calcination conditions, the particles which are close to cubes or particles have polyhedral shapes having at least 8 planes which are close to spheres and have the uniform shape and particle size.

The particle size and particle size distribution of the yttrium-aluminum garnet powder of the present invention are in the specific ranges. The particle size is controlled in the range between about 1 µm and several hundred µm. This control can be achieved by the selection of the raw material and the calcination conditions of the above described method of the present invention.

As the raw material powder for the production of single crystal, one having a larger particle size is suitable. For this purpose, yttrium-aluminum garnet comprising particles having a particle size of at least 20 µm, more preferably at least about 50 µm can be used. That is, the above described method can produce yttrium-aluminum garnet powder having a relatively large average particle size suitable for the production of single crystal, in an industrially advantageous process.

According to the present invention, the yttrium-aluminum garnet powder having, as the particle size distribution, the $D_{90}/D_{10}$ ratio of 10 or less, preferably 5 or less is readily produced. Further, the garnet powder having the ratio of the agglomerated particle size to the primary particle size of preferably 1 to 3, more preferably 1 to 2 is easily obtained.

Accordingly, the yttrium-aluminum garnet powder of the present invention is suitable for a fluorescent substance properties of which are influenced by the particle size, uniformity and dispersibility of the raw material.

The iron garnet powder such as yttrium-iron and gadolinium-iron garnet powder of the present invention is a mass of particles constituting the powder, and characterized in that their shape and particle size are uniform.

The shape is a polyhedral shape having at least 8 planes. Its particle size and particle size distribution are in the specific ranges. The particle size is controlled in the range between about 1 µm and several hundred µm. This control can be achieved by the selection of the raw material and the calcination conditions of the above described method of the present invention.

According to the present invention, the iron garnet powder having, as the particle size distribution, the $D_{90}/D_{10}$ ratio of 10 or less, preferably 5 or less is readily produced. Further, the garnet powder having the ratio of the agglomerated particle size to the primary particle size of preferably 1 to 3, more preferably 1 to 2 is easily obtained.

The solid solution powder of yttrium oxide and zirconium oxide is a mass of particles constituting the powder, and characterized in that their shape and particle size are uniform. The shape is a polyhedral shape having at least 8 planes. Its particle size and particle size distribution are in the specific ranges. The particle size is controlled in the range between about 0.1 μm and several ten μm. This control can be achieved by the selection of the raw material and the calcination conditions of the above described method of the present invention.

According to the present invention, it is possible to obtain the various complex metal oxide powders each comprising at least two metal elements, which are not agglomerated particles but have the narrow particle distribution that cannot be hitherto achieved.

The obtained complex metal oxide powder comprising at least two metal elements is a mass of the uniform polyhedral particles, and can be used in the variety of applications such as the raw materials of the metal oxide base ceramics which are used as the functional material or the structural material, as the filler, abrasive or pigment, or the raw material powder for the production of a single crystal or for flame spray coating. By the selection of the particle size and amount of the seed crystal, the complex metal oxide having the above properties and the arbitrarily controlled particle size can be obtained.

EXAMPLES

Hereinafter, the present invention will be explained in detail by examples, which do not limit the scope of the present invention in any way.

The measurements in the examples were carried out as follows:

1. Number Average Particle Size of Metal Oxide Powder

A scanning electron microscopic photograph of a metal oxide powder was taken using an electron microscope (T-300 manufactured by Nippon Electron Co., Ltd.). From the photograph, 80 to 100 particles were selected and image analyzed to calculate an average value of equivalent circle diameters of the particles and the distribution. The equivalent circle diameter is a diameter of a circle having the same area as that of each particle in the photograph.

2. Particle Size Distribution of Metal Oxide Powder

The particle size distribution was measured using a master sizer (manufactured by Malvern Instrument, Inc.) or a laser diffraction type particle size distribution analyzer (SALD-1100 manufactured by Shimadzu Corporation).

The metal oxide powder was dispersed in an aqueous solution of polyammonium acrylate or a 50 wt. % aqueous solution of glycerol, and particle sizes at 10%, 50% and 90% accumulation, respectively from the smallest particle size side in a cumulative particle size curve of the particles were measured as the $D_{10}$, $D_{50}$ and $D_{90}$. The $D_{50}$ was used as the agglomerated particle size, and the $D_{90}/D_{10}$ ratio was calculated as the criterion of the particle size distribution.

3. Crystal Phase of Metal Oxide Powder

The crystal phase of the metal oxide powder was measured by the X-ray diffraction method (RAD-C manufactured by Rigaku Co., Ltd.)

4. BET Specific Surface Area of Metal Oxide Powder

A BET specific surface area of a metal oxide powder was measured by FLOWSORB-II (manufactured by Micromelitics).

5. Analysis of Composition of Metal Oxide Powder

The metal oxide powder is dissolved in, for example, a mixed acid of phosphoric acid/sulfuric acid, and a composition of the metal oxide powder is analyzed using an inductively coupled plasma apparatus SPS 1200-VR manufactured by Seiko.

As the hydrogen chloride gas, bomb hydrogen chloride (purity: 99.9%) supplied by Tsurumi Soda Co., Ltd. or a decomposition gas of ammonium chloride (WAKO JUNYAKU, Special Grade Chemical) was used. When the decomposition gas of ammonium chloride was used, sublimation gas of ammonium chloride prepared by heating ammonium chloride at a temperature higher than its sublimation point was introduced in the furnace muffle to prepare the atmosphere gas. Ammonium chloride was completely decomposed at 1100° C. to provide a gas consisting of 33 vol. % of hydrogen chloride gas, 17 vol. % of nitrogen gas and 50 vol. % of hydrogen gas.

As the chloride gas, bomb chlorine gas (purity: 99.4%) supplied by Fujimoto Industries, Co., Ltd.) was used.

As the hydrogen bromide gas, a decomposition gas of ammonium bromide (WAKO JUNYAKU, Special Grade Chemical) was used. Sublimation gas of ammonium bromide prepared by heating ammonium bromide at a temperature higher than its sublimation point was introduced in the furnace muffle to prepare the atmosphere gas. Ammonium bromide was completely decomposed at 1100° C. to provide a gas consisting of 33 vol. % of hydrogen bromide gas, 17 vol. % of nitrogen gas and 50 vol. % of hydrogen gas.

As the hydrogen iodide gas, a decomposition gas of ammonium iodide (WAKO JUNYAKU, Special Grade Chemical) was used. Sublimation gas of ammonium iodide prepared by heating ammonium iodide at a temperature higher than its sublimation point was introduced in the furnace muffle to prepare the atmosphere gas. Ammonium iodide was completely decomposed at 1100° C. to provide a gas consisting of 25 vol. % of hydrogen iodide gas, 16 vol. % of nitrogen gas, 52 vol. % of hydrogen gas, and 6 vol. % of iodine (I, $I_2$) which is formed by the decomposition of hydrogen iodide.

The raw material metal oxide power was filled in an alumina or platinum vessel. When the halogen gas was used, the powder was filled in the alumina vessel. A depth of the filled powder was 5 mm.

The calcination was carried out in a cylindrical furnace having a quartz muffle or an alumina muffle (manufactured by Motoyama Co., Ltd.). With flowing an air or a nitrogen gas, temperature was raised at a heating rate of from 300° C./hr. to 500° C./hr., and when the temperature reached an atmosphere gas introduction temperature, the atmosphere gas was introduced.

A concentration of the atmosphere gas was adjusted by controlling gas flow rates by flow meters. The flow rate of the atmosphere was adjusted to a linear velocity of 20 mm/min. The total pressure of the atmosphere was always 1 atmosphere.

After the temperature reached the predetermined temperature, the powder was maintained at that temperature for a predetermined period of time. They will be referred to as "maintaining temperature" (calcination temperature) and "maintaining time" (calcination time).

After the predetermined maintaining time, the powder was spontaneously cooled to obtain the intended metal oxide powder.

The partial pressure of steam was adjusted by the change of saturated steam pressure depending on water temperature, and the steam was introduced in the furnace with an air or the nitrogen gas.

Example 1

An yttrium oxide powder (Purity of 99.9%, and a center particle size of 0.4 µm. Manufactured by Nippon Yttrium Co., Ltd.) (3.387 g) and gamma aluminum oxide (AKP-G15 manufactured by Sumitomo Chemical Co., Ltd.) (2.683 g) were charged in isopropanol (WAKO JUNYAKU. Special Grade Chemical) (100 g) and stirred for 10 minutes with dispersion by the application of ultrasonic wave, followed by removal of isopropanol by an evaporator and a vacuum dryer to obtain a mixed powder of yttrium oxide and aluminum oxide. This powder was filled in a platinum vessel. Its bulk density was 12 of the theoretical density.

Then, the powder was placed in the quartz muffle, and heated from room temperature at a heating rate of 300° C./hr. while flowing the nitrogen gas at a linear velocity of 20 mm/min. When the temperature reached 4000C., the nitrogen gas was changed to an atmosphere gas of 100 vol. % hydrogen chloride. With flowing this atmosphere gas at a linear velocity of 20 mm/min., the powder was calcined at 1100° C. for 60 minutes, followed by spontaneous cooling to obtain an yttrium-aluminum garnet powder. The weight of the powder in the platinum vessel after calcination was 86% of that of the powder before calcination.

Figure 2:
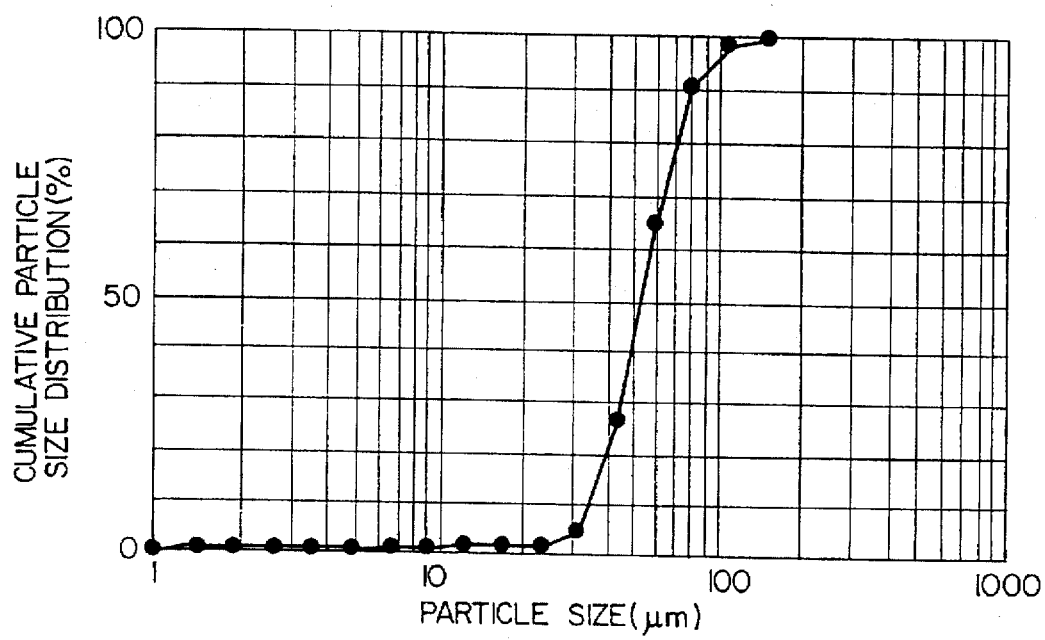
FIG. 2 is a graph showing a particle size distribution of the yttrium-aluminum garnet powder of Example 1.
Figure 3:
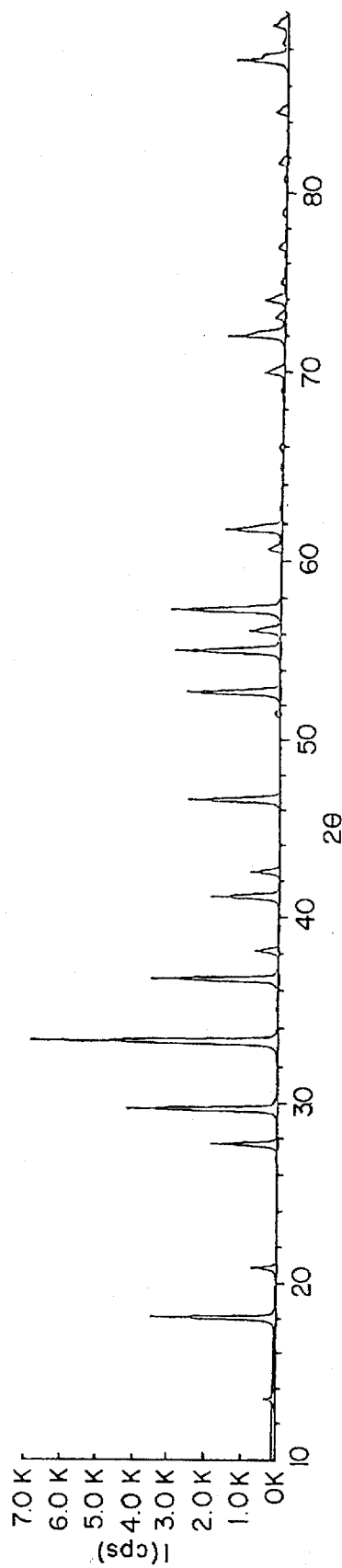
FIG. 3 is an X-ray diffraction pattern of the yttrium-aluminum garnet powder of Example 1.

The obtained powder was the yttrium-aluminum garnet represented by $Y_3Al_5O_{12}$ according to the result of the X-ray diffraction analysis, and no other peak was observed. According to the observation by the scanning electron microscope, the yttrium-aluminum garnet oxide consisted of polyhedral particles having at least 8 planes, and had the number average particle size of 40 µm. The agglomerated particle size ($D_{50}$) according to the particle size distribution measurement was 52 µm, and the $D_{90}/D_{10}$ ratio was 2, which indicated the narrow particle size distribution. The ratio of the agglomerated particle size to the number average particle size was 1.3. The results are shown in Table 1. An electron microscopic photograph of the obtained powder is shown in FIG. 1, the particle size distribution is shown in FIG. 2, and the X-ray diffraction pattern is shown in FIG. 3.

Example 2

In the same manner as in Example 1 except that alpha aluminum oxide (AKP-50 manufactured by Sumitomo Chemical Co., Ltd.) (2.549 g) was used in place of the gamma aluminum oxide, a mixed powder of yttrium oxide and aluminum oxide was obtained. A bulk density of this powder was 17% of the theoretical value.

Thereafter, in the same manner as in Example 1, yttrium-aluminum garnet powder was obtained.

Figure 4:
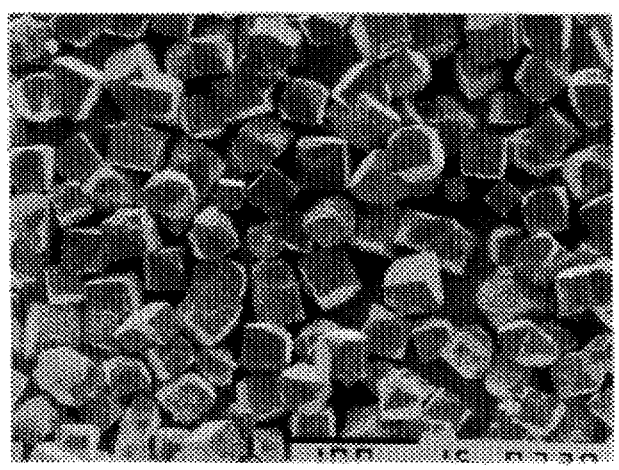
FIG. 4 is a scanning electron microscopic photograph (×172) showing a particle structure of an yttrium-aluminum garnet powder observed in Example 2.
Figure 5:
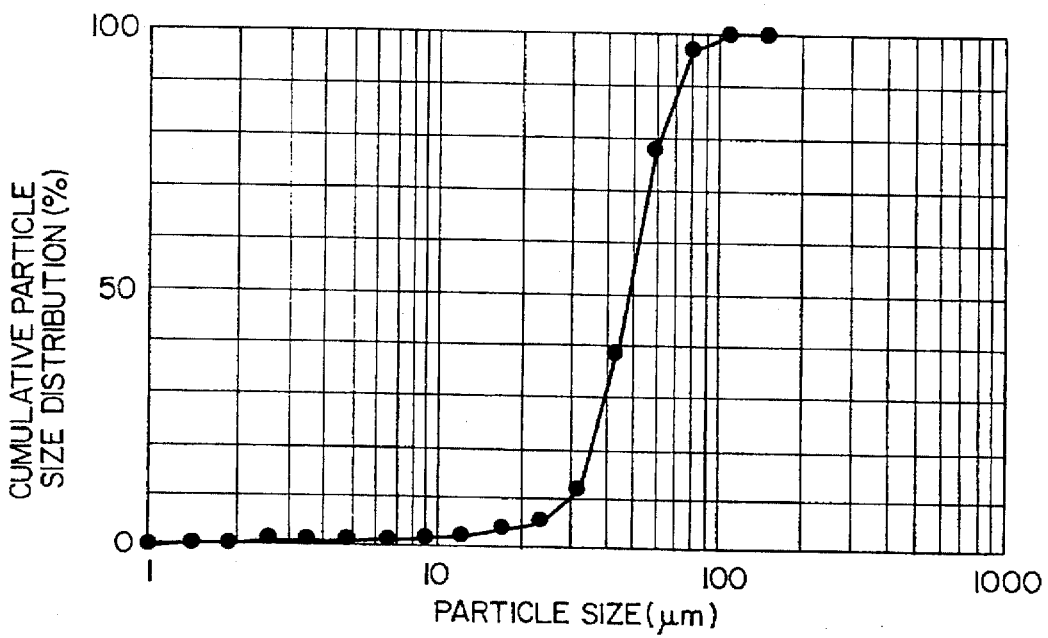
FIG. 5 is a graph showing a particle size distribution of the yttrium-aluminum garnet powder of Example 2.
Figure 6:
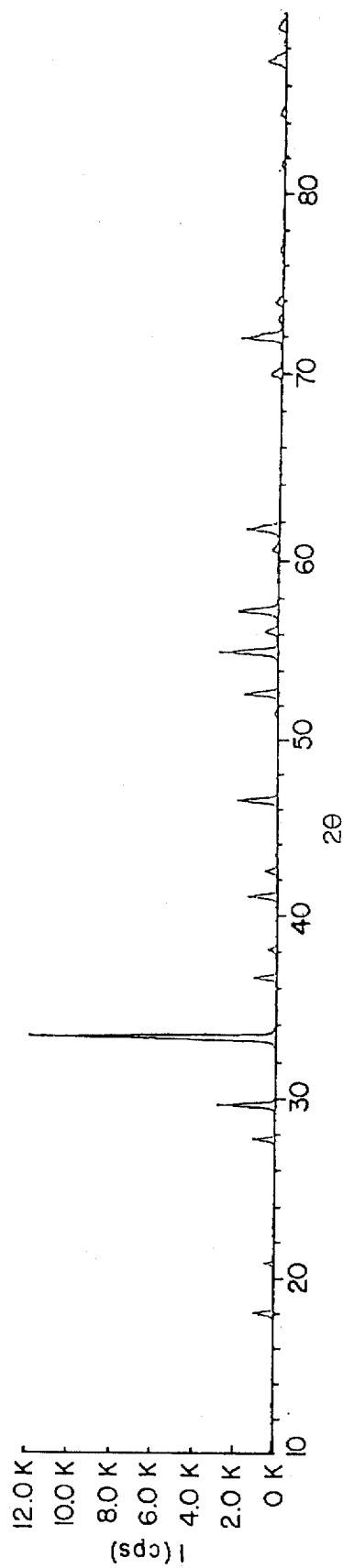
FIG. 6 is an X-ray diffraction pattern of the yttrium-aluminum garnet powder of Example 2.

The obtained powder was the yttrium-aluminum garnet represented by $Y_3Al_5O_{12}$ according to the result of the X-ray diffraction analysis, and no other peak was observed. According to the observation by the scanning electron microscope, the yttrium-aluminum garnet oxide consisted of polyhedral particles having a cubic shape or a cubic shape corners of which were truncated, and had the number average particle size of 38 µm. The agglomerated particle size ($D_{50}$) according to the particle size distribution measurement was 47 µm, and the $D_{90}/D_{10}$ ratio was 3, which indicated the narrow particle size distribution. The ratio of the agglomerated particle size to the number average particle size was 1.2. The results are shown in Table 1. An electron microscopic photograph of the obtained powder is shown in FIG. 4, the particle size distribution is shown in FIG. 5, and the X-ray diffraction pattern is shown in FIG. 6.

Example 3

In the same manner as in Example 1 except that an atmosphere gas consisting of 30 vol. % of chlorine, 10 vol. % of steam and 60 vol. % of nitrogen was used in place of the atmosphere gas of 100 vol. % hydrogen chloride, the yttrium-aluminum garnet powder was obtained. The results are shown in Table 1.

Example 4

Figure 7:
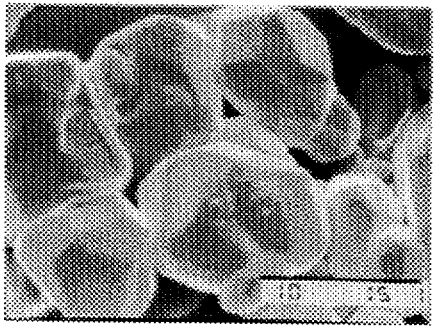
FIG. 7 is a scanning electron microscopic photograph (×3000) showing a particle structure of an yttrium-aluminum garnet powder observed in Example 4.

In the same manner as in Example 1 except that an atmosphere gas of 100 vol. % of chlorine was used in place of the atmosphere gas of 100 vol. % hydrogen chloride, and the calcination temperature was changed to 1150° C., the yttrium-aluminum garnet powder was obtained. An electron microscopic photograph of the obtained powder is shown in FIG. 7. The results are shown in Table 1.

Example 5

The mixed powder of yttrium oxide and aluminum oxide which was used as the raw material in Example 1 was calcined at 1200° C. for 3 hours to obtain a seed crystal. According to the X-ray diffraction analysis, this seed crystal showed peaks assigned to $YAlO_3$, $Y_4Al_2O_9$, $Y_2O_3$, $Al_2O_3$, etc. in addition to the peaks assigned to yttrium-aluminum garnet represented by $Y_3Al_5O_{12}$.

This seed crystal was added in an amount of 3 wt. % to the mixed powder of yttrium oxide and aluminum oxide which was used as the raw material in Example 1 to obtain the raw material powder containing the seed crystal. The addition manner comprised dispersing the raw material powder and the seed crystal by ultrasonic wave in isopropanol to prepare a slurry and drying the slurry with an evaporator and a vacuum drier.

In the same manner as in Example 1 except that the above raw material powder containing the seed crystal was used, the yttrium-aluminum garnet powder was obtained.

Figure 8:
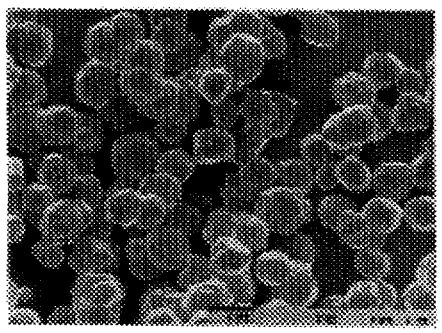
FIG. 8 is a scanning electron microscopic photograph (×850) showing a particle structure of an yttrium-aluminum garnet powder observed in Example 5.

The obtained powder was the yttrium-aluminum garnet represented by $Y_3Al_5O_{12}$ according to the X-ray diffraction analysis, and no other peak was observed. The results are shown in Table 1. An electron microscopic photograph of the obtained powder is shown in FIG. 8.

Example 6

The mixed powder of yttrium oxide and aluminum oxide which was used as the raw material in Example 1 was calcined at 1400° C. for 3 hours to obtain a seed crystal. According to the X-ray diffraction analysis, this seed crystal showed peaks assigned to $Y_2O_3$, $Al_2O_3$, etc. in addition to the peaks assigned to yttrium-aluminum garnet represented by $Y_3Al_5O_{12}$.

Figure 9:
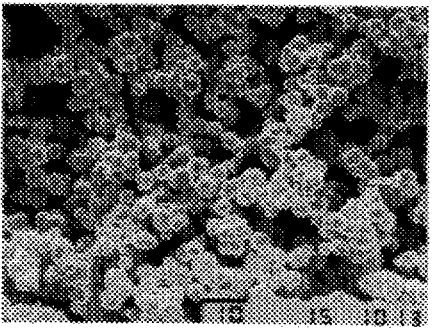
FIG. 9 is a scanning electron microscopic photograph (×850) showing a particle structure of an yttrium-aluminum garnet powder observed in Example 6.
Figure 10:
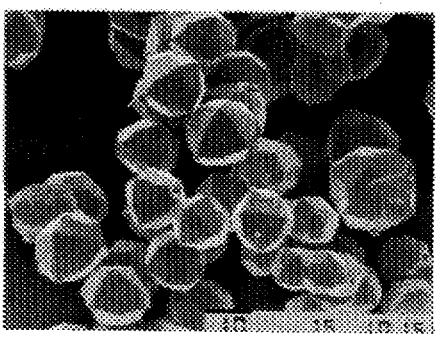
FIG. 10 is a scanning electron microscopic photograph (×850) showing a particle structure of an yttrium-aluminum garnet powder observed in Example 10.

In the same manner as in Example 5 except that the above seed crystal was used, the yttrium-aluminum garnet powder was obtained. The results are shown in Table 1. An electron microscopic photograph of the obtained powder is shown in FIG. 9.

Example 7

An yttrium oxide powder (Manufactured by Nippon Yttrium Co., Ltd. Purity of 99.9%, and an average particle size of 0.4 μm) (3.387 g) and aluminum oxide (AKP-G15, gamma aluminum oxide manufactured by Sumitomo Chemical Co., Ltd. Purity of 99.99%) (2.952 g) were charged in isopropanol (100 g) and wet mixed, followed by removal of isopropanol to obtain a mixed powder of yttrium oxide and aluminum oxide (A ratio of Y:Al=3:5.5). This powder was used as a raw material powder.

This powder was filled in a platinum vessel, placed in the quartz muffle, and heated from room temperature at a heating rate of 300° C./hr. while flowing the nitrogen gas at a linear velocity of 20 mm/min. When the temperature reached 400° C., the nitrogen gas was changed to an atmosphere gas of 10 vol. % of hydrogen chloride and 90 vol. % of nitrogen. With flowing this atmosphere gas at a linear velocity of 20 mm/min., the powder was calcined at 1100° C. for 60 minutes, followed by spontaneous cooling to obtain an yttrium-aluminum garnet powder. The results are shown in Table 1.

Example 8

In the same manner as in Example 1 except that the same raw material mixed powder was calcined at 900° C., the yttrium-aluminum garnet powder was obtained. According to the X-ray diffraction analysis, it was confirmed that the obtained powder was a single phase of yttrium-aluminum garnet. The results are shown in Table 1.

Example 9

The mixed powder of yttrium oxide and aluminum oxide as used in Example 2 was precalcined at 1200° C. in an air for 3 hours. According to the X-ray diffraction analysis, the calcined powder showed peaks assigned to $YAlO_3$, $Y_4Al_2O_9$, $Y_2O_3$, $Al_2O_3$, etc. in addition to the peaks assigned to yttrium-aluminum garnet represented by $Y_3Al_5O_{12}$.

The calcined powder contained partly formed yttrium-aluminum garnet, that is, a seed crystal of yttrium-aluminum garnet.

In the same manner as in Example 1 except that the above powder was used as the raw material powder, the yttrium-aluminum garnet powder was obtained. According to the X-ray diffraction analysis, the obtained powder was a single phase of the yttrium-aluminum garnet. According to the observation by the scanning electron microscope, the yttrium-aluminum garnet oxide consisted of polyhedral particles having a cubic shape or a cubic shape corners of which were truncated. The results are shown in Table 1.

Example 10

The raw material powder as used in Example 7 was filled in the alumina vessel, placed in the quartz muffle, and heated at a heating rate of 300° C./hr. When the temperature reached 400° C., a sublimation decomposition gas of ammonium bromide was introduced in the muffle, and in this decomposition gas atmosphere, the powder was calcined at 1100° C. for 60 minutes, followed by spontaneous cooling to obtain the yttrium-aluminum garnet powder. The components of the decomposed gas of ammonium bromide at 1100° C. were hydrogen bromide gas, nitrogen and hydrogen in a volume ratio of 33:17:50.

FIG. 8 is the electron microscopic photograph showing the particle structure of the obtained powder. According to the X-ray diffraction analysis, it was confirmed that the powder was a single phase of yttrium-aluminum garnet. The results are shown in Table 1.

TABLE 1

| Ex. No. | Oxide | Atmosphere gas (vol. %) | | | | | | | | | Gas introduction temp. (°C.) | Maintaining temp. (°C.) | Maintaining time (min.) |
|---|---|---|---|---|---|---|---|---|---|---|---|---|---|
| | | HCl | HBr | HI | $I_2$ | $Cl_2$ | $N_2$ | $H_2O$ | $H_2$ | Air | | | |
| 1 | $Y_3Al_5O_{12}$ | 100 | | | | | | | | | 400 | 1100 | 60 |
| 2 | $Y_3Al_5O_{12}$ | 100 | | | | | | | | | 400 | 1100 | 60 |
| 3 | $Y_3Al_5O_{12}$ | | | | | 30 | 60 | 10 | | | 400 | 1150 | 60 |
| 4 | $Y_3Al_5O_{12}$ | | | | | 100 | | | | | 400 | 1150 | 60 |
| 5 | $Y_3Al_5O_{12}$ | 100 | | | | | | | | | 400 | 1100 | 60 |
| 6 | $Y_3Al_5O_{12}$ | 100 | | | | | | | | | 400 | 1100 | 60 |
| 7 | $Y_3Al_5O_{12}$ | 10 | | | | | 90 | | | | 400 | 1100 | 60 |
| 8 | $Y_3Al_5O_{12}$ | 100 | | | | | | | | | 400 | 900 | 60 |
| 9 | $Y_3Al_5O_{12}$ | 100 | | | | | | | | | 400 | 1100 | 60 |
| 10 | $Y_3Al_5O_{12}$ | | 33 | | | | 17 | | 50 | | 400 | 1100 | 60 |

| Ex. No. | Number average particle size (μm) | Agglomerated particle size $D_{50}$ (μm) | Ratio of $D_{50}$ to No. Av. particle size | $D_{90}/D_{10}$ | Particle shape |
|---|---|---|---|---|---|
| 1 | 40 | 52 | 1.3 | 2 | Polyhedral |
| 2 | 38 | 47 | 1.2 | 3 | Cubic |
| 3 | 39 | 46 | 1.2 | 4 | Polyhedral |
| 4 | 10 | 24 | 2.4 | 4 | Polyhedral |
| 5 | 9 | 14 | 1.5 | 3 | Polyhedral |
| 6 | 4 | 9 | 2.4 | 5 | Polyhedral |
| 7 | 8 | 11 | 1.4 | 5 | Polyhedral |
| 8 | 40 | 43 | 1.1 | 2 | Polyhedral |
| 9 | 3 | 6 | 2.1 | 5 | Cubic |
| 10 | 14 | 21 | 1.5 | 3 | Polyhedral |

Example 11

An yttrium oxide powder (Manufactured by Nippon Yttrium Co., Ltd. Purity of 99.9%, and an average particle size of 0.4 μm) (6.436 g), a terbium oxide powder (Manufactured by Kanto Chemical Co., Ltd. Purity of 99.95%) (0.561 g) and an aluminum oxide powder (AKP-G15, gamma alumina manufactured by Sumitomo Chemical Co., Ltd. Purity 99.99%) (5.903 g) were charged in isopropanol (100 g) and wet mixed, followed by removal of isopropanol to obtain a mixed powder of a raw material mixed powder in which 5 atomic % of yttrium was replaced by terbium.

In the same manner as in Example 1 except that this raw material mixed powder was used, a terbium-substituted yttrium-aluminum garnet powder was obtained.

According to the X-ray diffraction analysis, it was confirmed that the obtained powder was a single phase of yttrium-aluminum garnet. According to the inductively coupled plasma analysis, it was confirmed that the produced particles contained 3.2 atomic % of terbium. The results are shown in Table 2.

Example 12

In the same manner as in Example 11 except that a dysprosium oxide powder (Manufactured by Nippon Yttrium Co., Ltd. Purity of 99.99%) (0.5595 g) was used in place of the terbium oxide powder, the raw material mixed powder in which 5 atomic % of yttrium was replaced by dysprosium was prepared.

In the same manner as in Example 1 except that the above raw material mixed powder was used, the dysprosium-replaced yttrium-aluminum garnet was obtained.

Figure 11:
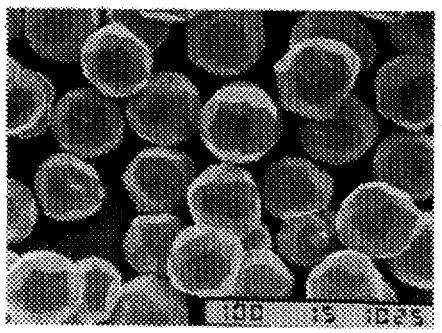
FIG. 11 is a scanning electron microscopic photograph (×425) showing a particle structure of a dysprosium-substituted yttrium-aluminum garnet powder observed in Example 12.

FIG. 11 is the electron microscopic photograph showing the structure of the obtained powder.

According to the X-ray diffraction analysis, it was confirmed that the obtained powder was a single phase of yttrium-aluminum garnet. According to the inductively coupled plasma analysis, it was confirmed that the produced particles contained 4.5 atomic % of dysprosium. The results are shown in Table 2.

Example 13

An yttrium oxide powder (Manufactured by Nippon Yttrium Co., Ltd. Purity of 99.9%, and an average particle size of 0.4 μm) (4.968 g) and an aluminum oxide powder (AKP-G15, gamma alumina manufactured by Sumitomo Chemical Co., Ltd. Purity 99.99%) (1.181 g) were charged in isopropanol (100 g) and wet mixed, followed by removal of isopropanol to obtain a mixed powder of a raw material mixed powder (Mixed ratio of Y:Al=3:1.5). In the same manner as in Example 1 except that this raw material mixed powder was used, the raw material powder was calcined.

The obtained power comprised the polyhedral particles and a by-product. According to the X-ray diffraction analysis, it was confirmed that the polyhedral particles were yttrium-aluminum garnet, and the by-product was yttrium oxychloride (YOCl). YOCl was easily removed by washing, and yttrium-aluminum garnet was selected. The results are shown in Table 2.

Example 14

An yttrium oxide powder (Manufactured by Nippon Yttrium Co., Ltd. Purity of 99.9%, and an average particle size of 0.4 μm) (2.936 g) and an aluminum oxide powder (AKP-G15, gamma alumina manufactured by Sumitomo Chemical Co., Ltd. Purity 99.99%) (3.256 g) were charged in isopropanol (100 g) and wet mixed, followed by removal of isopropanol to obtain a mixed powder of yttrium oxide and aluminum oxide (Mixed ratio of Y:Al=3:7) as a raw material powder. In the same manner as in Example 1 except that this raw material mixed powder was used, the raw material powder was calcined.

The obtained power comprised the polyhedral particles and particles having relatively small particle sizes. According to the X-ray diffraction analysis, it was confirmed that the polyhedral particles were yttrium-aluminum garnet and the small size particles were $\alpha$-$Al_2O_3$. $\alpha$-$Al_2O_3$ was removed by sieving, and yttrium-aluminum garnet was selected. The results are shown in in Table 2.

Example 15

The raw material powder as used in Example 1 was filled in the platinum vessel, placed in the quartz muffle, and heated at a heating rate of 300° C./hr. When the temperature reached 400° C., a sublimation decomposition gas of ammonium iodide was introduced in the muffle, and in this decomposition gas atmosphere, the powder was calcined at 1200° C. for 60 minutes, followed by spontaneous cooling to obtain the yttrium-aluminum garnet powder. The components of the decomposed gas of ammonium iodide at 1200° C. were hydrogen iodide gas, iodine, nitrogen and hydrogen in a volume ratio of 25:6:16:52.

According to the X-ray diffraction analysis, it was confirmed that the obtained powder was a single phase of yttrium-aluminum garnet. The results are shown in Table 1.

Comparative Examples 1 and 2

The mixed powder of yttrium oxide and aluminum oxide as used in each of Examples 1 and 2 was calcined in an air at 1200° C. for 3 hours to obtain the respective oxide powder.

According to the X-ray diffraction analysis of the oxide powder, the oxide powder showed peaks assigned to $YAlO_3$, $Y_4Al_2O_9$, $Y_2O_3$, $Al_2O_3$, etc. in addition to the peaks assigned to yttrium-aluminum garnet represented by $Y_3Al_5O_{12}$. According to the observation by the scanning electron microscope, no polyhedral particle was formed, and the particles had irregular shapes and were in the agglomerated state.

The powder of Comparative Example 1 had the number average particle size of 0.2 μm. The agglomerated particle size ($D_{50}$) according to the particle size distribution measurement was 4 μm, and the $D_{90}/D_{10}$ ratio was 15, which indicated the broad particle size distribution. A ratio of the agglomerated particle size to the number average particle size was 20.

Figure 12:
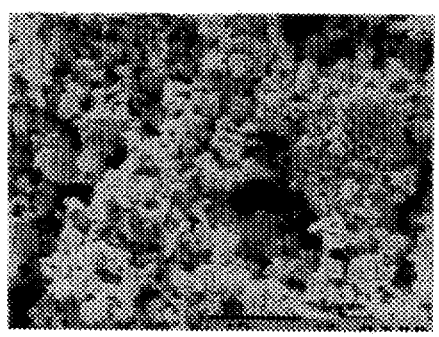
FIG. 12 is a scanning electron microscopic photograph (×1720) showing a particle structure of an oxide powder observed in Comparative Example 1.
Figure 13:
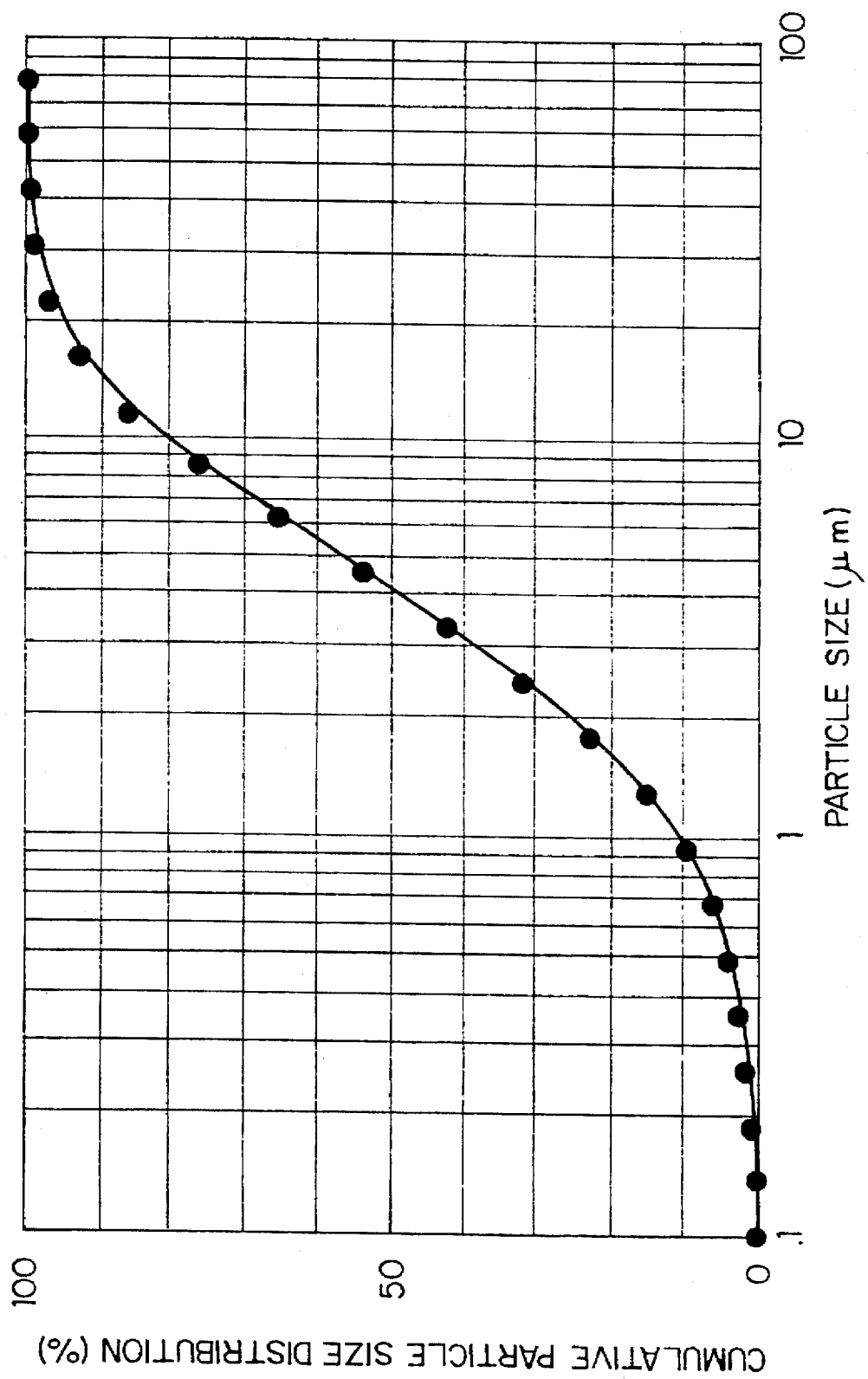
FIG. 13 is a graph showing a particle size distribution of the oxide powder observed in Comparative Example 1.

The results are shown in Table 2. The scanning electron microscopic photograph of the powder obtained in Comparative Example 1 is shown in FIG. 12. The particle size distribution of the powder obtained in Comparative Example 2 is shown in FIG. 13.

Comparative Example 3

The raw material mixed powder as used in Example 1 was calcined in the air at 1400° C. According to the X-ray diffraction analysis, the obtained powder comprised yttrium-aluminum garnet as the main phase, but $YAlO_3$, $\alpha$-$Al_2O_3$, and $Y_2O_3$ were observed. The crystal growth was not clear, the particles had irregular shapes and were in the agglomerated state, and no yttrium-aluminum garnet having a uniform particle size was formed. The results are shown in Table 2.

Comparative Example 4

In the same manner as in Example 6 except that an atmosphere gas of 100 vol. % air was supplied from the room temperature in place of the atmosphere gas of 100 vol. % hydrogen chloride, the raw material powder was calcined to obtain the oxide powder.

According to the X-ray diffraction analysis, the obtained powder showed peaks assigned to $YAlO_3$, $Y_4Al_2O_9$, $Y_2O_3$, $Al_2O_3$, etc. in addition to the peaks assigned to yttrium-aluminum garnet represented by $Y_3Al_5O_{12}$. According to the observation by the scanning electron microscope, no polyhedral particle was formed, and the particles had irregular shapes and were in the agglomerated state. The results are shown in Table 2.

Then, the powder was placed in the quartz muffle, and heated from room temperature at a heating rate of 300° C./hr. while flowing the nitrogen gas at a linear velocity of 20 mm/min. When the temperature reached 400° C., the nitrogen gas was changed to an atmosphere gas of 100 vol. % hydrogen chloride. With flowing this atmosphere gas at a linear velocity of 20 mm/min., the powder was calcined at 1200° C. for 60 minutes, followed by spontaneous cooling to obtain an oxide powder.

The obtained powder was the dysprosium-aluminum garnet represented by $Dy_3Al_5O_{12}$ according to the X-ray diffraction analysis, and no other peak was observed. According to the observation by the scanning electron microscope, the dysprosium-aluminum garnet oxide consisted of polyhedral particles having at least 8 planes, and had the number average particle size of 44 μm. The agglomerated particle size ($D_{50}$) according to the particle size distribution measurement was 53 μm, and the $D_{90}/D_{10}$ ratio was 3, which indicated the narrow particle size distribution. The ratio of

TABLE 2

| Ex. No. | Oxide | Calcination conditions ||||||||| Gas introduction temp. (°C.) | Maintaining temp. (°C.) | Maintaining time (min.) |
| | | Atmosphere gas (vol. %) ||||||||| | | |
| | | HCl | HBr | HI | $I_2$ | $Cl_2$ | $N_2$ | $H_2O$ | $H_2$ | Air | | | |
| 11 | $Y_{1-x}Tb_xAl_5O_{12}$ | 100 | | | | | | | | | 400 | 1100 | 60 |
| 12 | $Y_{1-x}Dy_xAl_5O_{12}$ | 100 | | | | | | | | | 400 | 1100 | 60 |
| 13 | $Y_3Al_5O_{12}$ | 100 | | | | | | | | | 400 | 1100 | 60 |
| 14 | $Y_3Al_5O_{12}$ | 100 | | | | | | | | | 400 | 1100 | 60 |
| 15 | $Y_3Al_5O_{12}$ | | | 25 | 6 | | 16 | | | 52 | 400 | 1200 | 60 |
| C.1 | [$Y_3Al_5O_{12}$] | | | | | | | | | 100 | Room temp. | 1200 | 180 |
| C.2 | [$Y_3Al_5O_{12}$] | | | | | | | | | 100 | Room temp. | 1200 | 180 |
| C.3 | [$Y_3Al_5O_{12}$] | | | | | | | | | 100 | Room temp. | 1400 | 180 |
| C.4 | [$Y_3Al_5O_{12}$] | | | | | | | | | 100 | Room temp. | 1100 | 60 |

| Ex. No. | Particle size distribution ||||| |
| | Number average particle size (μm) | Agglomerated particle size $D_{50}$ (μm) | Ratio of $D_{50}$ to No. Av. particle size | $D_{90}/D_{10}$ | Particle shape |
| 11 | 30 | 39 | 1.3 | 4 | Polyhedral |
| 12 | 33 | 42 | 1.3 | 3 | Polyhedral |
| 13 | 35 | | | | Polyhedral |
| 14 | 45 | | | | Polyhedral |
| 15 | 9 | 11 | 1.2 | 4 | Polyhedral |
| C.1 | 0.2 | 4 | 20 | 15 | (Amorphous) |
| C.2 | 0.2 | 4 | 20 | 33 | (Amorphous) |
| C.3 | 1 | 5.2 | 5.2 | 39 | (Amorphous) |
| C.4 | 0.3 | 5 | 16 | 12 | (Amorphous) |

Note:
The bracketed oxide means that the oxide in the brackets was not obtained or not obtained in a single phase.

Example 16

Figure 14:
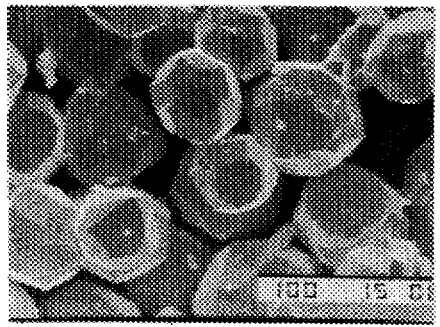
FIG. 14 is a scanning electron microscopic photograph (×425) showing a particle structure of a dysprosium-aluminum garnet powder observed in Example 16.

A dysprosium oxide powder (Purity of 99.99%. Manufactured by Nippon Yttrium Co., Ltd.) and gamma aluminum (AKP-G15 manufactured by Sumitomo Chemical Co., Ltd.) were weighed so that a molar ratio of dysprosium to aluminum was 3:5, and mixed in isopropanol (WAKO JUNYAKU. Special Grade Chemical) with dispersing the powders by the application of ultrasonic wave, followed by removal of isopropanol by an evaporator and a vacuum dryer to obtain a mixed powder of dysprosium oxide and aluminum oxide. This powder was filled in a platinum vessel.

the agglomerated particle size to the number average particle size was 1.2. The results are shown in Table 3. An electron microscopic photograph of the obtained powder is shown in FIG. 14.

Comparative Example 5

The mixed powder of dysprosium oxide and aluminum oxide as prepared in Example 16 was calcined in an air at 1200° C. for 3 hours to obtain an oxide powder.

Figure 15:
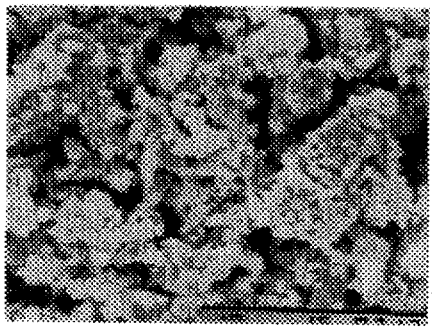
FIG. 15 is a scanning electron microscopic photograph (×4250) showing a particle structure of an oxide powder observed in Comparative Example 5.

According to the X-ray diffraction analysis of the obtained oxide powder, peaks assigned to $Al_2Dy_4O_9$, $AlDy_3$, $Dy_2O_3$, $Al_2O_3$, etc. were observed, but no peak to be assigned to the dysprosium-aluminum garnet represented by $Dy_3Al_5O_{12}$ was observed. According to the observation by the scanning electron microscope, no polyhedral particle was formed, and the particles had irregular shapes and were in the agglomerated state. The results are shown in Table 3. The electron microphotograph of the obtained powder is shown in FIG. 15.

Hereinafter, Examples and Comparative Examples for yttrium-iron garnet, gadolinium-iron garnet, and dysprosium-iron garnet will be explained.

Example 17

Gamma iron (III) oxide (A BET specific surface area of 34.4 m²/g) was charged in an alumina crucible and heated in an air at a heating rate of 300° C./hr. and at 1000° C. for 3 hours to obtain an iron oxide powder. This powder had the BET specific surface area of 0.8 m²/g.

The above iron oxide and an yttrium oxide powder (Purity of 99.9%. A center particle size of 0.4 μm. Manufactured by Nippon Yttrium Co., Ltd.) were weighed so that a molar ratio of yttrium to iron was 3:5, and mixed in isopropanol (WAKO JUNYAKU. Special Grade Chemical) with dispersing the powders by the application of ultrasonic wave, followed by removal of isopropanol by an evaporator and a vacuum dryer to obtain a mixed powder of yttrium oxide and iron oxide. This powder was filled in a platinum vessel.

Then, the powder was placed in the quartz muffle, and heated from room temperature at a heating rate of 300° C./hr. while flowing the nitrogen gas at a linear velocity of 20 mm/min. When the temperature reached 600° C., the nitrogen gas was changed to an atmosphere gas consisting of 10 vol. % of hydrogen chloride and 90 vol. % of nitrogen gas. With flowing this atmosphere gas at a linear velocity of 20 mm/min., the powder was calcined at 1000° C. for 60 minutes, followed by spontaneous cooling to obtain an oxide powder.

Figure 16:
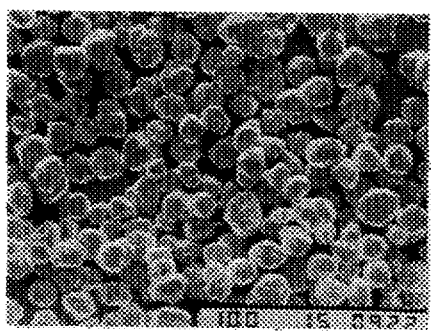
FIG. 16 is a scanning electron microscopic photograph (×425) showing a particle structure of an yttrium-iron garnet powder observed in Example 17.

The obtained powder was the yttrium-iron garnet represented by $Y_3Fe_5O_{12}$ according to the X-ray diffraction analysis, and no other peak was observed. According to the observation by the scanning electron microscope, the yttrium-iron garnet powder consisted of polyhedral particles having at least 8 planes, and had the number average particle size of 13 μm. The agglomerated particle size ($D_{50}$) according to the particle size distribution measurement was 16 μm, and the $D_{90}/D_{10}$ ratio was 2, which indicated the narrow particle size distribution. The ratio of the agglomerated particle size to the number average particle size was 1.2. The results are shown in Table 3. An electron microscopic photograph of the obtained powder is shown in FIG. 16.

Comparative Example 6

The mixed powder of yttrium oxide and iron oxide as prepared in Example 17 was calcined in an air at 1100° C. for one hour to obtain an oxide powder.

Figure 17:
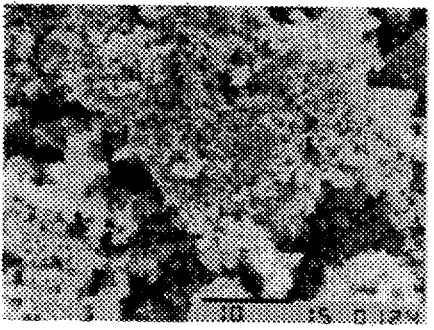
FIG. 17 is a scanning electron microscopic photograph (×1720) showing a particle structure of an oxide powder observed in Comparative Example 6.

According to the X-ray diffraction analysis of the obtained oxide powder, peaks assigned to $Y_2O_3$ and $Fe_2O_3$ were mainly observed, and only small peaks assigned to $YFeO_3$ and $Y_3Fe_5O_{12}$ were observed. According to the observation by the scanning electron microscope, no polyhedral particle was formed, and the particles had irregular shapes and were in the agglomerated state. The results are shown in Table 3. The electron microphotograph of the obtained powder is shown in FIG. 17.

Example 18

Gamma iron (III) oxide (A BET specific surface area of 34.4 m²/g) was charged in an alumina crucible and heated in an air at a heating rate of 300° C./hr. and at 1000° C. for 3 hours to obtain an iron oxide powder.

The above iron oxide and a gadolinium oxide powder (Purity of 99.99%. Manufactured by Nippon Yttrium Co., Ltd.) were weighed so that a molar ratio of gadolinium to iron was 3:6, and mixed in isopropanol (WAKO JUNYAKU. Special Grade Chemical) with dispersing the powders by the application of ultrasonic wave, followed by removal of isopropanol by an evaporator and a vacuum dryer to obtain a mixed powder of gadolinium oxide and iron oxide.

Then, this mixed powder was used as the raw material powder and calcined in the same manner as in Example 17 to obtain an oxide powder.

Figure 18:
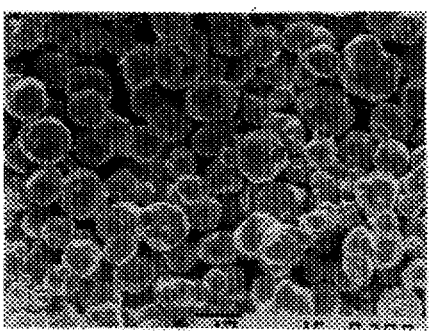
FIG. 18 is a scanning electron microscopic photograph (×850) showing a particle structure of a gadolinium-iron garnet powder observed in Example 18.

The obtained powder was the gadolinium-iron garnet represented by $Gd_3Fe_5O_{12}$ according to the X-ray diffraction analysis, and no other peak was observed. According to the observation by the scanning electron microscope, the gadolinium-iron garnet oxide consisted of polyhedral particles having at least 8 planes. The results are shown in Table 3. An electron microscopic photograph of the obtained powder is shown in FIG. 18.

Comparative Example 7

The mixed powder of gadolinium oxide and iron oxide as prepared in Example 18 was calcined in an air at 1200° C. for 3 hours to obtain an oxide powder.

Figure 19:
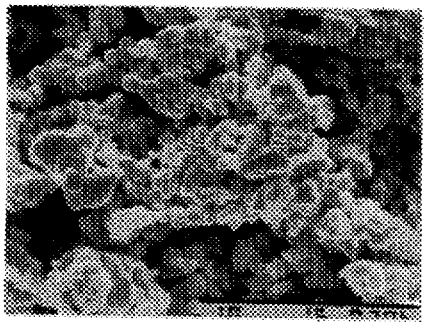
FIG. 19 is a scanning electron microscopic photograph (×4250) showing a particle structure of an oxide powder observed in Comparative Example 7.

According to the X-ray diffraction analysis of the obtained oxide powder, peaks assigned to $GdFeO_3$, $Gd_2O_3$ and $Fe_2O_3$ were observed, but no peak to be assigned to $Gd_3Fe_5O_{12}$ was observed. According to the observation by the scanning electron microscope, no polyhedral particle was formed, and the particles had irregular shapes and were in the agglomerated state. The results are shown in Table 3. The electron microphotograph of the obtained powder is shown in FIG. 19.

Example 19

In the same manner as in Example 18 except that a dysprosium oxide powder (Purity of 99.99%. Manufactured by Nippon Yttrium Co., Ltd.) was used in place of the gadolinium oxide powder, the raw material powder was prepared and calcined to obtain an oxide powder.

The obtained powder was the dysprosium-iron garnet represented by $Dy_3Fe_5O_{12}$ according to of the X-ray diffraction analysis, and no other peak was observed. According to the observation by the scanning electron microscope, the dysprosium-iron garnet oxide consisted of polyhedral particles having at least 8 planes. The results are shown in Table 3.

Comparative Example 8

The mixed powder of dysprosium oxide and iron oxide as prepared in Example 19 was calcined in an air at 1200° C. for 3 hours to obtain an oxide powder.

According to the X-ray diffraction analysis of the obtained oxide powder, peaks assigned to $DyFeO_3$, $Dy_2O_3$ and $Fe_2O_3$ were observed, but no peak to be assigned to $Dy_3Fe_5O_{12}$ was observed. According to the observation by the scanning electron microscope, no polyhedral particle was formed, and the particles had irregular shapes and were in the agglomerated state. The results are shown in Table 3.

An Example and a Comparative Example for a solid solution powder of yttrium oxide and zirconium oxide will be explained.

Example 20

Zirconium oxychloride octahydrate (WAKO JUNYAKU. Special Grade Chemical) (39.2 g) and an aqueous solution of yttrium nitrate (100 g/l in terms of yttrium oxide. Purity of 99.9%. Manufactured by Nippon Yttrium Co., Ltd.) (28.26 g) were dissolved in pure water (400 g) to obtain an aqueous solution of the yttrium salt and the zirconium salt. To an aqueous ammonia (25 wt. %. WAKO JUNYAKU. Special Grade Chemical) (500 ml) in a 2 liter beaker, the above aqueous solution of the yttrium salt and the zirconium salt was added over 2 hours while stirring to neutralize the salts and coprecipitate them. The precipitate was filtered through a filter paper and washed with pure water, followed by drying in vacuo at 100° C. to obtain a precursor of a solid solution of yttrium oxide and zirconium oxide. When the precursor was calcined, an oxide solid solution consisting of 92 mol % of zirconium oxide and 8 mol % of yttrium oxide was formed.

This precursor powder was filled in a platinum vessel. The bulk density of this powder was 15% of the theoretical value.

Then, the powder was placed in the quartz muffle, and heated from room temperature at a heating rate of 300° C./hr. while flowing an air at a linear velocity of 20 mm/min. When the temperature reached 400° C., the nitrogen gas was changed to an atmosphere gas of 100 vol. % hydrogen chloride. With flowing this atmosphere gas at a linear velocity of 20 mm/min., the powder was calcined at 1200° C. for 60 minutes, followed by spontaneous cooling to obtain a solid solution powder of yttrium oxide and zirconium oxide.

Figure 20:
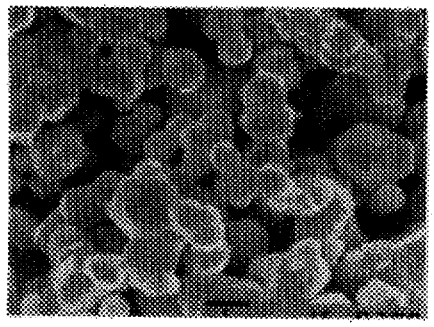
FIG. 20 is a scanning electron microscopic photograph (×8500) showing a particle structure of a powder of a solid solution of yttrium oxide and zirconium oxide observed in Example 20.

According to the observation by the scanning electron microscope, the solid solution powder of yttrium oxide and zirconium oxide consisted of polyhedral particles having at least 8 planes. The results are shown in Table 3. An electron microscopic photograph of the obtained powder is shown in FIG. 20.

Comparative Example 9

The precursor powder of solid solution of yttrium oxide and zirconium oxide as prepared in Example 20 was calcined in an air at 1200° C. for one hour to obtain a solid solution powder of yttrium oxide and zirconium oxide.

Figure 21:
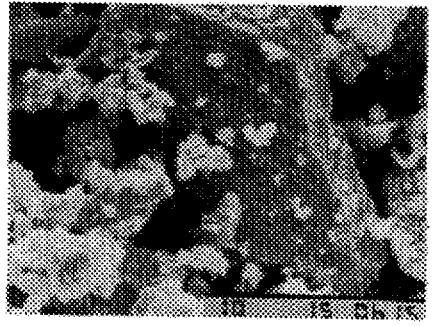
FIG. 21 is a scanning electron microscopic photograph (×4250) showing a particle structure of a powder of a solid solution of yttrium oxide and zirconium oxide observed in Comparative Example 9.

According to the observation by the scanning electron microscope, no polyhedral particle was formed, and the particles had irregular shapes and were in the agglomerated state. The results are shown in Table 3. The electron microphotograph of the obtained powder is shown in FIG. 21.

TABLE 3

| Ex. No. | Oxide | Calcination conditions ||||||||| |
|---|---|---|---|---|---|---|---|---|---|---|---|---|
| | | Atmosphere gas (vol. %) ||||||||| Gas introduction temp. (°C.) | Maintaining temp. (°C.) | Maintaining time (min.) |
| | | HCl | HBr | HI | $I_2$ | $Cl_2$ | $N_2$ | $H_2O$ | $H_2$ | Air | | | |
| 16 | $Dy_3Al_5O_{12}$ | 100 | | | | | | | | | 400 | 1200 | 60 |
| C.5 | $[Dy_3Al_5O_{12}]$ | | | | | | | | | 100 | Room temp. | 1200 | 180 |
| 17 | $Y_3Fe_5O_{12}$ | 10 | | | | | 90 | | | | 600 | 1000 | 60 |
| C.6 | $[Y_3Fe_5O_{12}]$ | | | | | | | | | 100 | Room temp. | 1100 | 60 |
| 18 | $Gd_3Fe_5O_{12}$ | 10 | | | | | 90 | | | | 600 | 1000 | 60 |
| C.7 | $[Gd_3Fe_5O_{12}]$ | | | | | | | | | 100 | Room temp. | 1200 | 180 |
| 19 | $Dy_3Fe_5O_{12}]$ | 10 | | | | | 90 | | | | 600 | 1000 | 60 |
| C.8 | $[Dy_3Fe_5O_{12}]$ | | | | | | | | | 100 | Room temp. | 1200 | 180 |
| 20 | $(Y_2O_3)_{0.08}$—$(ZrO_2)_{0.92}$ | 100 | | | | | | | | | Room temp. | 1200 | 60 |
| C.9 | $[Y_2O_3)_{0.08}$—$(ZrO_2)_{0.92}]$ | | | | | | | | | 100 | Room temp. | 1200 | 60 |

| Ex. No. | Number average particle size (µm) | Particle size distribution ||| $D_{90}/D_{10}$ | Particle shape |
|---|---|---|---|---|---|---|
| | | Agglomerated particle size $D_{50}$ (µm) | Ratio of $D_{50}$ to No. Av. particle size | | | |
| 16 | 44 | 53 | 1.2 | | 3 | Polyhedral |
| C.5 | 0.2 | 5 | 24 | | 17 | (Amorphous) |
| 17 | 13 | 16 | 1.2 | | 2 | Polyhedral |
| C.6 | 0.3 | 7 | 22 | | 54 | (Amorphous) |
| 18 | 9 | 13 | 1.4 | | 4 | Polyhedral |
| C.7 | 1.5 | 5 | 3.2 | | 19 | (Amorphous) |
| 19 | 7 | 14 | 2.0 | | 4 | Polyhedral |
| C.8 | 1.5 | 5 | 3.3 | | 23 | (Amorphous) |
| 20 | 1.0 | | | | | Polyhedral |
| C.9 | <0.1 | | | | | (Amorphous) |

Note:
The bracketed oxide means that the oxide in the brackets was not obtained or not obtained in a single phase.

What is claimed is:

1. A method for producing a complex metal oxide powder comprising at least two metal elements, which method comprises calcining a mixture of at least two metal oxide powders and/or metal oxide precursor powders, or a metal oxide precursor powder comprising at least two metal elements in an atmosphere containing at least one gas selected from the group consisting of:

(1) a hydrogen halide,
(2) a component prepared from a molecular halogen and steam and
(3) a molecular halogen.

2. The method according to claim 1, wherein a gas contained in said atmosphere gas is a hydrogen halide.

3. The method according to claim 2, wherein said hydrogen halide is hydrogen chloride, hydrogen bromide or hydrogen iodide.

4. The method according to claim 2, wherein a concentration of said hydrogen halide in said atmosphere gas is at least 1 vol. %.

5. The method according to claim 1, wherein a gas contained in said atmosphere gas is said component prepared from a molecular halogen and steam.

6. The method according to claim 5, wherein said molecular halogen is chlorine, bromine or iodine.

7. The method according to claim 5, wherein said component prepared from a molecular halogen and steam is a component prepared from at least 1 vol. % of said molecular halogen and at least 0.1 vol. % of steam, both based on said atmosphere gas.

8. The method according to claim 1, wherein a gas contained in said atmosphere gas is a molecular halogen, said molecular halogen is chlorine, bromine or iodine, and a concentration of said molecular halogen in said atmosphere gas is at least 1 vol. %.

9. The method according to claim 1, wherein a bulk density of said mixture of at least two metal oxide powders and/or metal oxide precursor powders, or said metal oxide precursor powder comprising at least two metal elements is 40% or less of a theoretical density.

10. The method according to claim 1, wherein said complex metal oxide powder is obtained at a site where said mixture of at least two metal oxide powders and/or metal oxide precursor powders, or said metal oxide precursor powder comprising at least two metal elements is present.

11. The method according to claim 1, wherein said at least two metals are a combination of metals excluding a combination of alkali metals only.

12. The method according to claim 1, wherein said complex metal oxide powder is a solid solution powder of metal oxides.

13. The method according to claim 11, wherein said complex metal oxide is a complex metal oxide powder having a garnet structure represented by the formula:

$$(M_A)_3(M_B)_2[(M_C)O_4]_3 \qquad (I)$$

wherein $M_A$, $M_B$ and $M_C$ each represent at least one metal element, provided that all of $M_A$, $M_B$ and $M_C$ are not the same metal element.

14. The method according to claim 13, wherein $M_A$ is at least one element selected from the group consisting of copper, magnesium, calcium, rare earth elements, bismuth and manganese, and $M_B$ and $M_C$ are the same or different and each is at least one element selected from the group consisting of zinc, scandium, aluminum, gallium, indium, titanium, zirconium, silicon, germanium, tin, vanadium, chromium, manganese, iron, cobalt and nickel.

15. The method according to claim 14, wherein $M_A$ is yttrium, and $M_B$ and $M_C$ are both aluminum.

16. The method according to claim 14, wherein $M_A$ is yttrium a part of which is replaced by other rare earth element, and $M_B$ and $M_C$ are both aluminum.

17. The method according to claim 16, wherein said other rare earth element is terbium or dysprosium.

18. The method according to claim 14, wherein $M_A$ is dysprosium, and $M_B$ and $M_C$ are both aluminum.

19. The method according to claim 14, wherein $M_A$ is a rare earth element, and $M_B$ and $M_C$ are both iron.

20. The method according to claim 19, wherein said rare earth element is yttrium, gadolinium or dysprosium.

21. The method according to claim 12, wherein said solid solution is a solid solution of zirconium oxide and yttrium oxide.

22. The method according to any one of claims 1 to 21, wherein said calcination is carried out in the presence of a seed crystal.

23. The method according to claim 22, wherein a bulk density of said seed crystal is 40% or less of a theoretical density.

* * * * *